(12) United States Patent
Gigushinski et al.

(10) Patent No.: US 11,689,708 B2
(45) Date of Patent: Jun. 27, 2023

(54) MULTI-APERTURE ZOOM DIGITAL CAMERAS AND METHODS OF USING SAME

(71) Applicant: Corephotonics Ltd., Tel Aviv (IL)

(72) Inventors: Oded Gigushinski, Tel Aviv (IL); Nadav Geva, Tel Aviv (IL); Guy Lifshitz, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 17/771,047

(22) PCT Filed: Dec. 27, 2020

(86) PCT No.: PCT/IB2020/062463
§ 371 (c)(1),
(2) Date: Apr. 22, 2022

(87) PCT Pub. No.: WO2021/140403
PCT Pub. Date: Jul. 15, 2021

(65) Prior Publication Data
US 2022/0394233 A1    Dec. 8, 2022

Related U.S. Application Data

(60) Provisional application No. 62/958,488, filed on Jan. 8, 2020.

(51) Int. Cl.
*H04N 13/25* (2018.01)
*G06T 7/593* (2017.01)
(Continued)

(52) U.S. Cl.
CPC .............. *H04N 13/25* (2018.05); *G06T 7/593* (2017.01); *H04N 13/243* (2018.05);
(Continued)

(58) Field of Classification Search
None
See application file for complete search history.

(56) References Cited

U.S. PATENT DOCUMENTS 2,106,752 A   2/1938 Land
2,354,503 A   7/1944 Cox
(Continued)

FOREIGN PATENT DOCUMENTS

CN   102193162 A   9/2011
CN   102147519 B   1/2013
(Continued)

OTHER PUBLICATIONS

International Search Report and Written Opinion in related PCT application PCT/IB2020/062463, dated May 24, 2021. 6 pages.
(Continued)

*Primary Examiner* — Eileen M Adams
(74) *Attorney, Agent, or Firm* — Nathan & Associates; Menachem Nathan

(57) ABSTRACT

Multi-aperture zoom digital cameras comprising first and second scanning cameras having respective first and second native fields of view (FOV) and operative to scan a scene in respective substantially parallel first and second planes over solid angles larger than the respective native FOV, wherein the first and second cameras have respective centers that lie on an axis that is perpendicular to the first and second planes and are separated by a distance B from each other, and a camera controller operatively coupled to the first and second scanning cameras and configured to control the scanning of each camera.

16 Claims, 8 Drawing Sheets

(51) Int. Cl.
  *H04N 13/243* (2018.01)
  *H04N 23/66* (2023.01)
  *H04N 23/698* (2023.01)
(52) U.S. Cl.
  CPC ........... *H04N 23/66* (2023.01); *H04N 23/698* (2023.01); *G06T 2207/10016* (2013.01)

(56) References Cited

U.S. PATENT DOCUMENTS

| | | |
|---|---|---|
| 2,378,170 A | 6/1945 | Aklin |
| 2,441,093 A | 5/1948 | Aklin |
| 3,388,956 A | 6/1968 | Eggert et al. |
| 3,524,700 A | 8/1970 | Eggert et al. |
| 3,558,218 A | 1/1971 | Grey |
| 3,864,027 A | 2/1975 | Harada |
| 3,942,876 A | 3/1976 | Betensky |
| 4,134,645 A | 1/1979 | Sugiyama et al. |
| 4,338,001 A | 7/1982 | Matsui |
| 4,465,345 A | 8/1984 | Yazawa |
| 5,000,551 A | 3/1991 | Shibayama |
| 5,969,869 A | 10/1999 | Hirai et al. |
| 6,014,266 A | 1/2000 | Obama et al. |
| 6,147,702 A | 11/2000 | Smith |
| 6,169,636 B1 | 1/2001 | Kreitzer |
| 6,654,180 B2 | 11/2003 | Ori |
| 7,187,504 B2 | 3/2007 | Horiuchi |
| 7,206,136 B2 | 4/2007 | Labaziewicz et al. |
| 7,515,351 B2 | 4/2009 | Chen et al. |
| 7,564,635 B1 | 7/2009 | Tang |
| 7,643,225 B1 | 1/2010 | Tsai |
| 7,660,049 B2 | 2/2010 | Tang |
| 7,684,128 B2 | 3/2010 | Tang |
| 7,688,523 B2 | 3/2010 | Sano |
| 7,692,877 B2 | 4/2010 | Tang et al. |
| 7,697,220 B2 | 4/2010 | Iyama |
| 7,738,186 B2 | 6/2010 | Chen et al. |
| 7,777,972 B1 | 8/2010 | Chen et al. |
| 7,813,057 B2 | 10/2010 | Lin |
| 7,821,724 B2 | 10/2010 | Tang et al. |
| 7,826,149 B2 | 11/2010 | Tang et al. |
| 7,826,151 B2 | 11/2010 | Tsai |
| 7,869,142 B2 | 1/2011 | Chen et al. |
| 7,898,747 B2 | 3/2011 | Tang |
| 7,916,401 B2 | 3/2011 | Chen et al. |
| 7,918,398 B2 | 4/2011 | Li et al. |
| 7,957,075 B2 | 6/2011 | Tang |
| 7,957,076 B2 | 6/2011 | Tang |
| 7,957,079 B2 | 6/2011 | Tang |
| 7,961,406 B2 | 6/2011 | Tang et al. |
| 8,000,031 B1 | 8/2011 | Tsai |
| 8,004,777 B2 | 8/2011 | Sano et al. |
| 8,077,400 B2 | 12/2011 | Tang |
| 8,149,523 B2 | 4/2012 | Ozaki |
| 8,218,253 B2 | 7/2012 | Tang |
| 8,228,622 B2 | 7/2012 | Tang |
| 8,233,224 B2 | 7/2012 | Chen |
| 8,253,843 B2 | 8/2012 | Lin |
| 8,279,537 B2 | 10/2012 | Sato |
| 8,363,337 B2 | 1/2013 | Tang et al. |
| 8,395,851 B2 | 3/2013 | Tang et al. |
| 8,400,717 B2 | 3/2013 | Chen et al. |
| 8,451,549 B2 | 5/2013 | Yamanaka et al. |
| 8,503,107 B2 | 8/2013 | Chen et al. |
| 8,514,502 B2 | 8/2013 | Chen |
| 8,570,668 B2 | 10/2013 | Takakubo et al. |
| 8,718,458 B2 | 5/2014 | Okuda |
| 8,780,465 B2 | 7/2014 | Chae |
| 8,810,923 B2 | 8/2014 | Shinohara |
| 8,854,745 B1 | 10/2014 | Chen |
| 8,958,164 B2 | 2/2015 | Kwon et al. |
| 9,185,291 B1 | 11/2015 | Shabtay et al. |
| 9,229,194 B2 | 1/2016 | Yoneyama et al. |
| 9,235,036 B2 | 1/2016 | Kato et al. |
| 9,279,957 B2 | 3/2016 | Kanda et al. |
| 9,438,792 B2 | 9/2016 | Nakada et al. |
| 9,488,802 B2 | 11/2016 | Chen et al. |
| 9,568,712 B2 | 2/2017 | Dror et al. |
| 9,678,310 B2 | 6/2017 | Iwasaki et al. |
| 9,817,213 B2 | 11/2017 | Mercado |
| 2002/0118471 A1 | 8/2002 | Imoto |
| 2003/0035100 A1 | 2/2003 | Dimsdale et al. |
| 2005/0041300 A1 | 2/2005 | Oshima et al. |
| 2005/0062346 A1 | 3/2005 | Sasaki |
| 2005/0128604 A1 | 6/2005 | Kuba |
| 2005/0141103 A1 | 6/2005 | Nishina |
| 2005/0168840 A1 | 8/2005 | Kobayashi et al. |
| 2005/0270667 A1 | 12/2005 | Gurevich et al. |
| 2006/0238902 A1 | 10/2006 | Nakashima et al. |
| 2007/0229983 A1 | 10/2007 | Saori |
| 2008/0056698 A1 | 3/2008 | Lee et al. |
| 2008/0094730 A1 | 4/2008 | Toma et al. |
| 2008/0304161 A1 | 12/2008 | Souma |
| 2009/0002839 A1 | 1/2009 | Sato |
| 2009/0067063 A1 | 3/2009 | Asami et al. |
| 2009/0122423 A1 | 5/2009 | Park et al. |
| 2009/0141365 A1 | 6/2009 | Jannard et al. |
| 2009/0147368 A1 | 6/2009 | Oh et al. |
| 2009/0225438 A1 | 9/2009 | Kubota |
| 2010/0165476 A1 | 7/2010 | Eguchi |
| 2010/0277813 A1 | 11/2010 | Ito |
| 2011/0001838 A1 | 1/2011 | Lee |
| 2011/0115965 A1 | 5/2011 | Engelhardt et al. |
| 2011/0149119 A1 | 6/2011 | Matsui |
| 2011/0157430 A1 | 6/2011 | Hosoya et al. |
| 2011/0188121 A1 | 8/2011 | Goring et al. |
| 2011/0249347 A1 | 10/2011 | Kubota |
| 2012/0069455 A1 | 3/2012 | Lin et al. |
| 2012/0092777 A1 | 4/2012 | Tochigi et al. |
| 2012/0105708 A1 | 5/2012 | Hagiwara |
| 2012/0154929 A1 | 6/2012 | Tsai et al. |
| 2012/0229920 A1 | 9/2012 | Otsu et al. |
| 2012/0262806 A1 | 10/2012 | Lin et al. |
| 2013/0057971 A1 | 3/2013 | Zhao et al. |
| 2013/0088788 A1 | 4/2013 | You |
| 2013/0208178 A1 | 8/2013 | Park |
| 2013/0279032 A1 | 10/2013 | Suigetsu et al. |
| 2013/0286488 A1 | 10/2013 | Chae |
| 2014/0022436 A1 | 1/2014 | Kim et al. |
| 2014/0092487 A1 | 4/2014 | Chen et al. |
| 2014/0146216 A1 | 5/2014 | Okumura |
| 2014/0204480 A1 | 7/2014 | Jo et al. |
| 2014/0285907 A1 | 9/2014 | Tang et al. |
| 2014/0293453 A1 | 10/2014 | Ogino et al. |
| 2014/0362274 A1 | 12/2014 | Christie et al. |
| 2015/0085080 A1 | 3/2015 | Hollenbeck et al. |
| 2015/0103159 A1 | 4/2015 | Shashua et al. |
| 2015/0116569 A1 | 4/2015 | Mercado |
| 2015/0244942 A1 | 8/2015 | Shabtay et al. |
| 2015/0253532 A1 | 9/2015 | Lin |
| 2015/0253543 A1 | 9/2015 | Mercado |
| 2015/0253647 A1 | 9/2015 | Mercado |
| 2015/0373252 A1 | 12/2015 | Georgiev |
| 2015/0373263 A1 | 12/2015 | Georgiev et al. |
| 2016/0044250 A1 | 2/2016 | Shabtay et al. |
| 2016/0062084 A1 | 3/2016 | Chen et al. |
| 2016/0070088 A1 | 3/2016 | Koguchi |
| 2016/0085089 A1 | 3/2016 | Mercado |
| 2016/0187631 A1 | 6/2016 | Choi et al. |
| 2016/0291295 A1 | 10/2016 | Shabtay et al. |
| 2016/0306161 A1 | 10/2016 | Harada et al. |
| 2016/0313537 A1 | 10/2016 | Mercado |
| 2016/0341931 A1 | 11/2016 | Liu et al. |
| 2016/0353008 A1 | 12/2016 | Osborne |
| 2017/0102522 A1 | 4/2017 | Jo |
| 2017/0115471 A1 | 4/2017 | Shinohara |
| 2017/0160511 A1 | 6/2017 | Kim et al. |
| 2017/0310952 A1 | 10/2017 | Adomat et al. |
| 2017/0337703 A1 | 11/2017 | Wu et al. |
| 2018/0059365 A1 | 3/2018 | Bone et al. |
| 2018/0137648 A1* | 5/2018 | Kang ............... H04N 5/232939 |
| 2018/0217475 A1 | 8/2018 | Goldenberg et al. |
| 2018/0218224 A1 | 8/2018 | Olmstead et al. |
| 2018/0224630 A1 | 8/2018 | Lee et al. |
| 2018/0268226 A1 | 9/2018 | Shashua et al. |

(56) References Cited

U.S. PATENT DOCUMENTS

| | | | |
|---|---|---|---|
| 2018/0364033 A1* | 12/2018 | Döring | G03B 35/08 |
| 2019/0075284 A1 | 3/2019 | Ono | |
| 2019/0121216 A1 | 4/2019 | Shabtay et al. | |
| 2019/0170965 A1 | 6/2019 | Shabtay et al. | |
| 2019/0257644 A1 | 8/2019 | Hillebrand | |
| 2019/0369242 A1* | 12/2019 | Wang | G02B 3/0056 |
| 2020/0221026 A1 | 7/2020 | Fridman et al. | |

FOREIGN PATENT DOCUMENTS

| | | |
|---|---|---|
| CN | 104297906 A | 1/2015 |
| CN | 105467563 A | 4/2016 |
| CN | 105657290 A | 6/2016 |
| JP | S54157620 A | 12/1979 |
| JP | S59121015 A | 7/1984 |
| JP | 6165212 A | 4/1986 |
| JP | S6370211 A | 3/1988 |
| JP | 406059195 A | 3/1994 |
| JP | H11223771 A | 8/1999 |
| JP | 2004334185 A | 11/2004 |
| JP | 2006195139 A | 7/2006 |
| JP | 2007133096 A | 5/2007 |
| JP | 2007219199 A | 8/2007 |
| JP | 2007306282 A | 11/2007 |
| JP | 2008191423 A | 8/2008 |
| JP | 2010164841 A | 7/2010 |
| JP | 2012203234 A | 10/2012 |
| JP | 2013105049 A | 5/2013 |
| JP | 2013106289 A | 5/2013 |
| JP | 2014142542 A | 8/2014 |
| KR | 20090131805 A | 12/2009 |
| KR | 20140135909 A | 5/2013 |
| KR | 20140023552 A | 2/2014 |
| KR | 101632168 B1 | 6/2016 |
| WO | 2013058111 A1 | 4/2013 |
| WO | 2013063097 A1 | 5/2013 |
| WO | 2018130898 A1 | 7/2018 |

OTHER PUBLICATIONS

A compact and cost effective design for cell phone zoom lens, Chang et al., Sep. 2007, 8 pages.

Consumer Electronic Optics: How small a lens can be? The case of panomorph lenses, Thibault et al., Sep. 2014, 7 pages.

Optical design of camera optics for mobile phones, Steinich et al., 2012, pp. 51-58 (8 pages).

The Optics of Miniature Digital Camera Modules, Bareau et al., 2006, 11 pages.

Modeling and measuring liquid crystal tunable lenses, Peter P. Clark, 2014, 7 pages.

Mobile Platform Optical Design, Peter P. Clark, 2014, 7 pages.

Boye et al., "Ultrathin Optics for Low-Profile Innocuous Imager", Sandia Report, 2009, pp. 56-56.

"Cheat sheet: how to understand f-stops", Internet article, Digital Camera World, 2017.

European Search Report in related EP patent application 20911367.9, dated Nov. 24, 2022.

Office Action in related EP patent application 20911367.9, dated Dec. 20, 2022.

Office Action in related CN patent application 202080077889.7, dated Sep. 15, 2022.

* cited by examiner

100
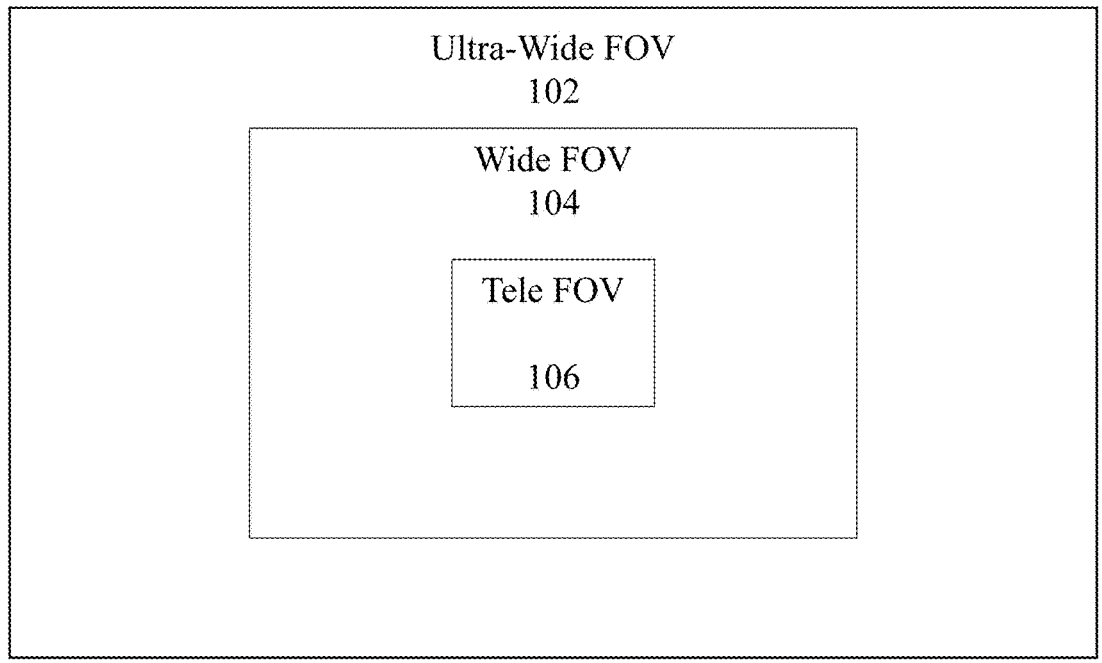
*FIG. 1A*  KNOWN ART
110
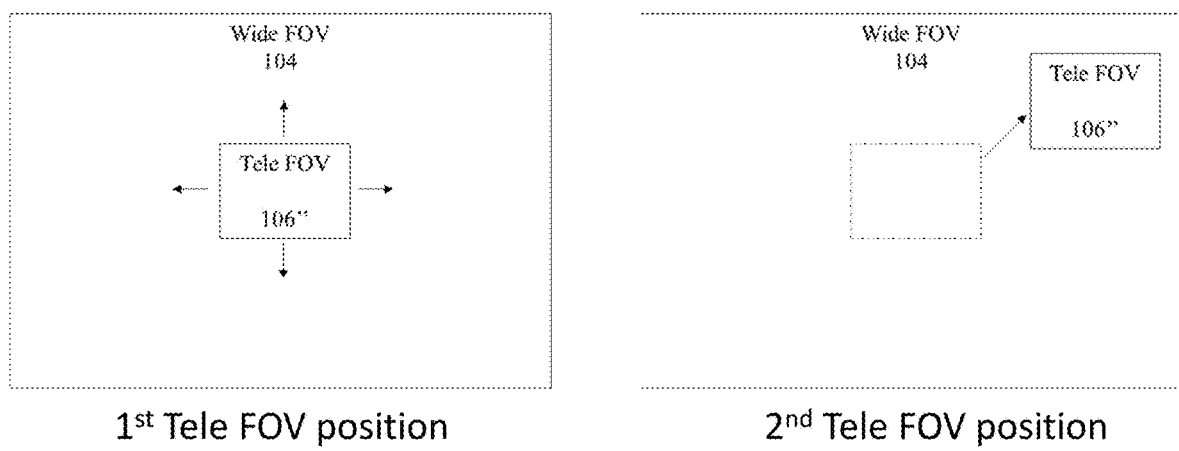
1st Tele FOV position      2nd Tele FOV position
*FIG. 1B*  KNOWN ART

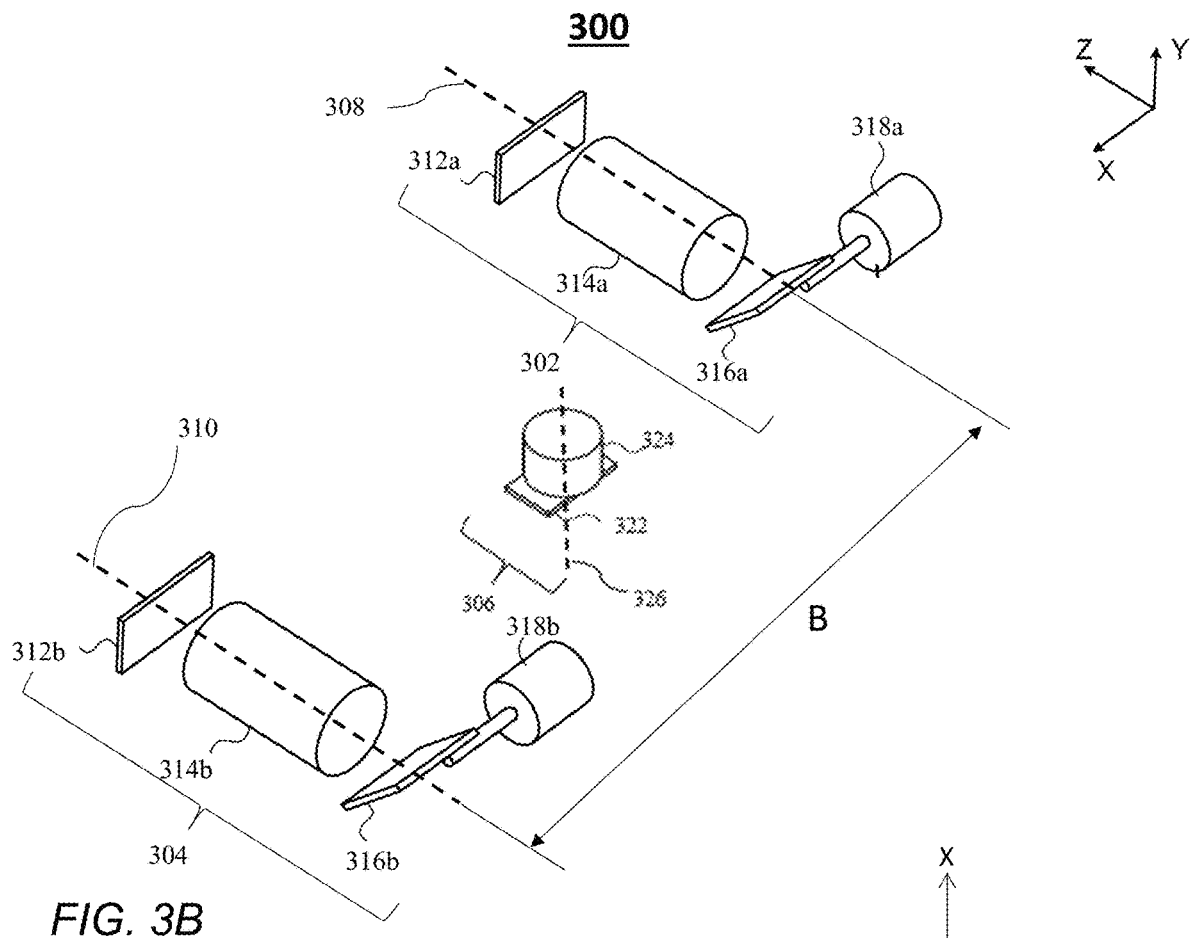
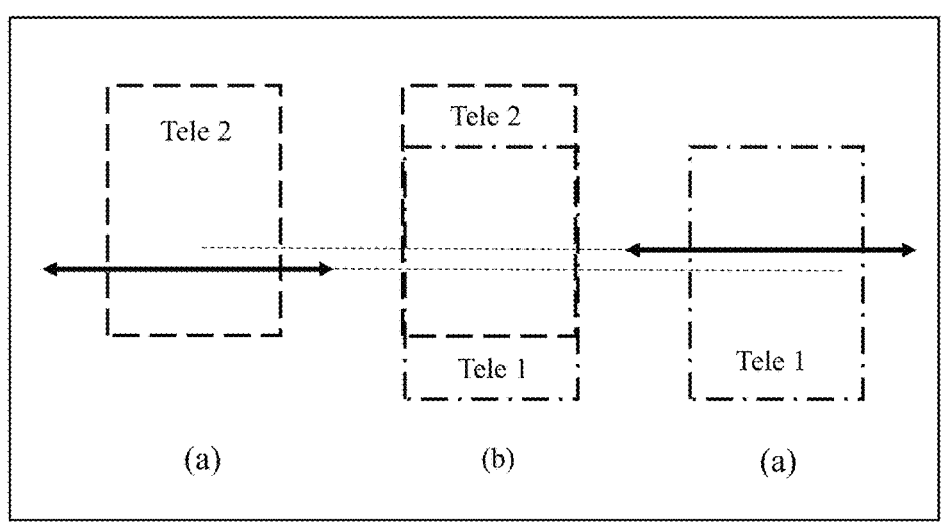
FIG. 3B
FIG. 3C

MULTI-APERTURE ZOOM DIGITAL CAMERAS AND METHODS OF USING SAME

CROSS REFERENCE TO RELATED APPLICATIONS

This is a 371 application from international patent application PCT/IB2020/062463 filed Dec. 27, 2020, and is related to and claims the benefit of U.S. provisional patent application No. 62/958,488 filed Jan. 8, 2020, which is incorporated herein by reference in its entirety.

FIELD

Embodiments disclosed herein relate in general to digital cameras and in particular to thin zoom digital cameras.

BACKGROUND

Multi-cameras are becoming a standard component of automotive sensor systems for advanced driver assistance systems (ADAS), along with radar, LiDAR, ultra-sound sensors and others. An automotive multi-camera setup usually comprises cameras with varying field-of-view (FOV), e.g. a dual-camera including one camera with a Wide (or "W") FOV ("$FOV_W$") and one camera with a narrow FOV ("$FOV_T$") referred to as Telephoto or "Tele" (or "T") camera or a triple-camera which additionally includes one camera with an Ultra-Wide (or "UW") FOV ("$FOV_{UW}$"). A multi-camera enables capture of areas with highly relevant image information, usually at the center of the FOV (e.g. a street segment and cars ahead), with a higher resolution than some surroundings (e.g. the sidewalk area) which are captured with a lower resolution. Henceforth, the term "resolution" refers to image spatial resolution.

Adding depth information from camera data can increase the quality of ADAS operations significantly. This information can be provided by stereo camera setups. Known stereo camera setups are based on two different designs: a first design using two cameras having identical FOVs (and identical additional camera components, such as optics block and image sensor), and a second design using two or more cameras having different FOVs. The first design has the advantage that the full resolution of each of the two cameras can be exploited for depth calculation from stereo camera data. The disadvantages are the need for an additional camera dedicated to stereo imaging only. The second design has the advantage that multi-cameras including different FOVs may be available in ADAS anyway. The disadvantages are that the camera with the lower resolution limits the depth resolution of the entire stereo camera system, and that the narrow FOV camera limits the FOV where stereo image data is available.

There is therefore a need for, and it would be beneficial to have a stereo camera system that supplies high resolution stereo image data over a large FOV.

SUMMARY

Embodiments disclosed herein teach the use of stereo camera setups with two scanning Tele cameras, each comprising an optical path folding element (OPFE), which are positioned along and separated by a baseline, and which acquire depth by scanning in a direction orthogonal to the baseline based on OPFE movement in one dimension, in order to not translate scanning errors into an error of stereo depth estimation.

In various exemplary embodiments there are provided systems comprising a first scanning camera operative to provide first image data of an object or scene and having a first native field of view FOV1, the first scanning camera operative to scan in a first plane over a solid angle larger than the native FOV1; a second scanning camera operative to provide second image data of the object or scene and having a second native field of view FOV2, the second scanning camera operative to scan in a second plane over a solid angle larger than the native FOV2, wherein the first plane and the second plane are substantially parallel, wherein the first and second scanning cameras have respective centers that lie on a first axis that is perpendicular to the first and second planes and are separated by a distance B from each other; and a camera controller operatively coupled to the first and second scanning cameras and configured to control the scanning of each camera.

In some embodiments, the first and second scanning cameras are folded scanning cameras, each camera including a respective OPFE.

In some embodiments, the scanning is performed by rotating the respective OPFE.

In some embodiments, the rotating of the respective OPFE is around an axis substantially parallel to the first axis.

In some embodiments, the camera controller is configured to control the scanning of each camera autonomously.

In some embodiments, the control of the scanning of each camera is based on use of the first image data and/or the second image data as input.

In some embodiments, the camera controller is configured to calculate depth information from the first image data and/or from the second image data.

In some embodiments, the camera controller is configured to calculate depth information from stereo image data derived from the first and the second image data.

In some embodiments, 2 cm>B>20 cm. In some embodiments, 7.5 cm>B>15 cm. In some embodiments, FOV1=FOV2.

In some embodiments, a system comprises a third camera operative to provide third image data of the object or scene and having a third field of view FOV3 larger than FOV1 and FOV2.

In some embodiments, the first camera or the second camera has a respective resolution at least two times higher than a resolution of the third camera.

In some embodiments, the control of the scanning of each camera is based on use of the third image as input.

In some embodiments, the system further comprises a sensor selected from the group consisting of a radar sensor, an ultra-sound sensor, and a light detection and ranging sensor.

In some embodiments, the control of the scanning of each camera is based on use of image data from the first camera and/or the second camera and/or the sensor.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure are generally labeled with a same numeral in all the figures in which they appear. The drawings and descriptions are meant to illuminate and clarify embodiments disclosed herein, and should not be considered limiting in any way.

FIG. 1A shows exemplary triple-camera output image sizes and ratios therebetween;

FIG. 1B shows exemplary fields of view of a dual-camera comprising a 2D scanning zoom camera;

FIG. 3B shows the triple-camera of FIG. 3A and its components in a perspective view;

FIG. 3C shows the two Tele cameras with respective fields of view (FOVs) (a) in first (separate) positions, and (b) in a second (overlapping) position;

DETAILED DESCRIPTION

FIG. 1A illustrates known triple-camera output image sizes and ratios therebetween. As mentioned above, the triple-camera includes may include for example an ultra-Wide FOV 102, a Wide FOV 104 and a Tele FOV 106. $FOV_{UW}$ may be 120-160 degree, $FOV_W$ may be 40-60 degree, and $FOV_T$ may be 20-35 degree, referring to horizontal FOV. Either of the ultra-Wide or Wide cameras may be used as a Wide camera for detection of objects of interest (OOIs) or regions of interest (ROIs). The Tele camera may be used to capture high-resolution images of ROIs or OOIs. An "OOI" may be for example a hazard, another vehicle, a hole or obstruction on a road, a pedestrian, debris, a sign, etc.

FIG. 1B illustrates the FOVs of dual-camera output images, for a dual camera that comprises one 2D scanning Tele camera as known in the art. A 2D scanning Tele camera has a "native $FOV_T$" wherein the location of the native $FOV_T$ in the scene can be changed in 2 dimensions, enabling to cover or "scan" a segment of a scene that is larger than the native $FOV_T$ both in a horizontal and in a vertical dimension. This larger scene segment is referred to as the "extended $FOV_T$". Examples of scanning Tele cameras can be found for example in co-owned international patent applications PCT/IB2019/055734, PCT/IB2016/057366, PCT/IB2019/053315 and PCT/IB2018/050988. In other examples, a scanning Tele camera may scan a segment of a scene that is larger than the native $FOV_T$ only in one dimension, e.g. only in a horizontal dimension or only in a vertical dimension.

Two different native Tele FOV 106" positions and their relationship to a Wide FOV 104 are shown. Native $FOV_T$ 106" may scan specific segments of the $FOV_W$ (104), the entire $FOV_W$, or segments of a scene that are out of the $FOV_W$. The FOV scanning may for example require a time scale of about 1-50 ms for scanning 2°-5° and of about 2-100 ms for scanning 10-25°.

Figure 2A:
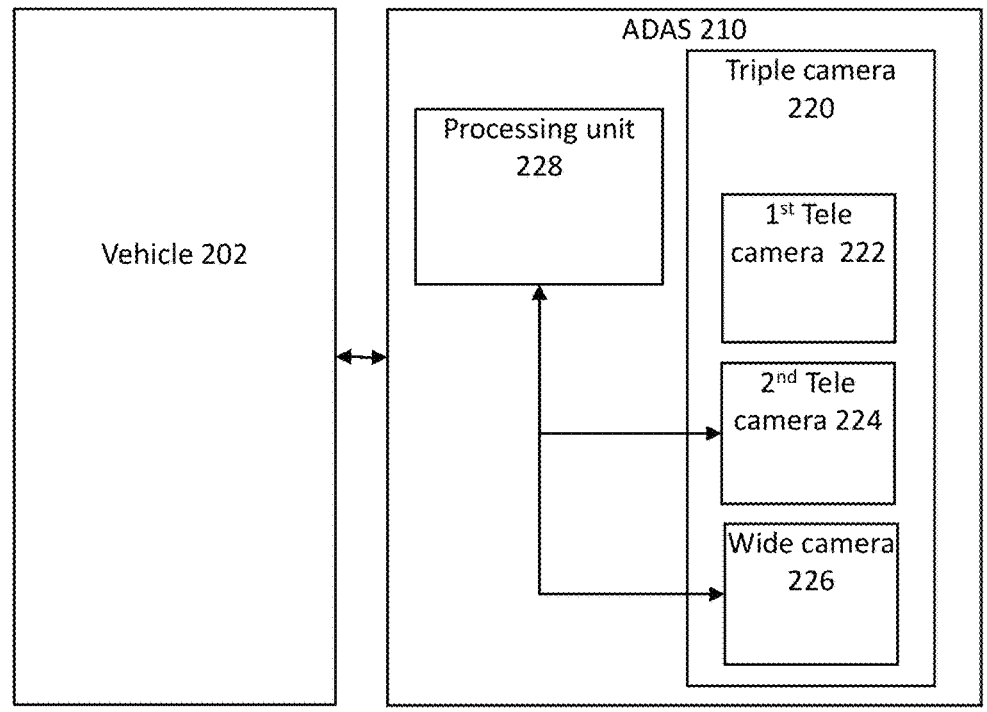
FIG. 2A shows schematically in a block diagram an embodiment of a system disclosed herein.

An automotive multi-camera comprising a scanning Tele camera can provide high-resolution image data over a large FOV. An automotive multi-camera comprising two scanning Tele cameras can provide high-resolution visual image data for a large FOV of a scene with a high rate of frames per second (fps), or high-resolution stereo image data. FIG. 2A shows an embodiment of a system disclosed herein and numbered 200. System 200 comprises a vehicle 202 and an ADAS 210 based on a triple-camera. Vehicle 202 may be for example a car, a bus, a truck, a motorcycle, a coach or any other type of motorized vehicle. ADAS 210 may be installed in, or attached to vehicle 202. ADAS 210 comprises a triple-camera 220 that includes a first (1$^{st}$) Tele camera 222, a second (2$^{nd}$) Tele camera 224 and a Wide camera 226, and a processing unit 228. Processing unit 228 may be a CPU, GPU, ASIC, FPGA, or any other processor capable of graphic analysis.

Figure 2B:
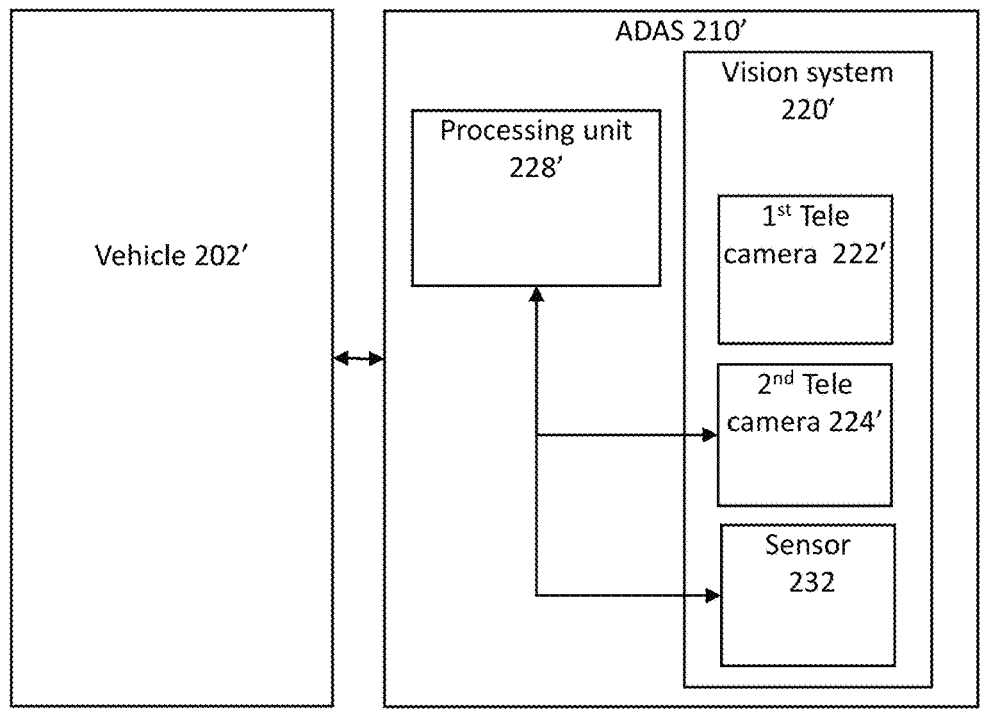
FIG. 2B shows schematically in a block diagram an embodiment of another system disclosed herein.

FIG. 2B shows an embodiment of another system disclosed herein and numbered 200'. System 200' comprises a vehicle 202' and an ADAS 210'. ADAS 210' may be installed in, or attached to vehicle 202. ADAS 210' comprises a vision system 220' that includes a first Tele camera 222', a second Tele camera 224', a processing unit 228' and a sensor 232. Sensor 232 may be a single imaging sensor or a system based on one or more imaging sensors, such as radar sensors, ultra-sound sensors, sensors based on light detection and ranging (LIDAR) technology, etc. Processing unit 228 or 228' may be configured to control the scanning of the 1$^{st}$ and/or 2$^{nd}$ Tele cameras autonomously.

In other examples, the system described herein may not be included in a vehicle, but in any other system using two scanning cameras, e.g. for surveillance.

Figure 3A:
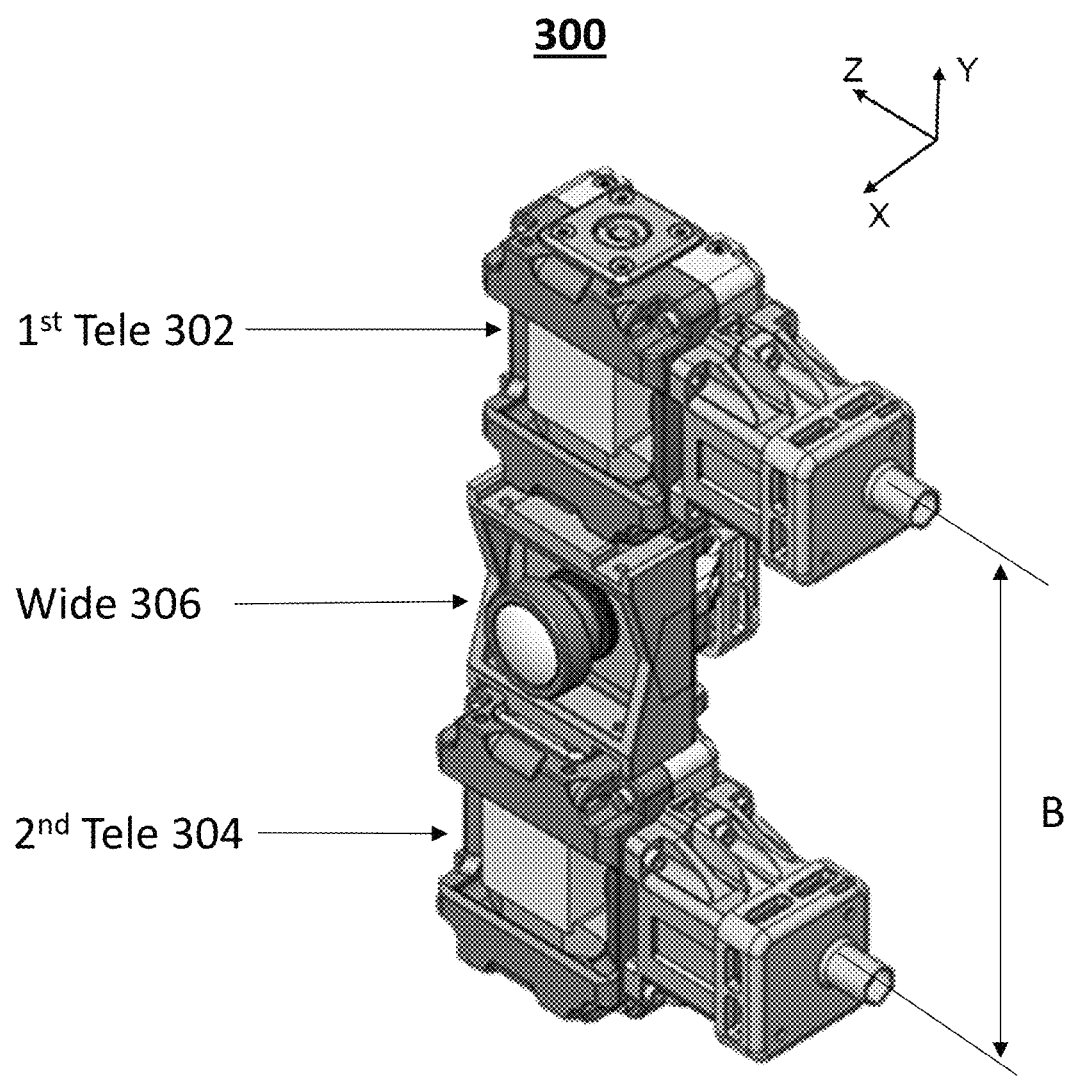
FIG. 3A shows an embodiment of a triple-camera with a Wide camera and two Tele cameras with scanning capability in one direction as described herein.

FIG. 3A shows an embodiment of a stereoscopic system (triple-camera) disclosed herein and numbered 300. Like camera 220, triple-camera 300 comprises a first Tele camera 302, a second Tele camera 304 and a Wide camera 306. As shown and for example, the two Tele cameras are places on two sides of the Wide camera in a Y (vertical) direction. In some embodiments, the Wide camera may be replaced by an UW camera, or by a combination of a Wide camera and an UW camera. In alternative embodiments, the Wide camera may be replaced by a sensor like sensor 232. Tele cameras 302 and 304 have centers (lens optical axes) separated by a baseline B, oriented here substantially parallel to the Y axis. In various examples, B may be in the range of 2-20 cm (for example 12 cm) or 15-50 cm. Triple-camera 300 may be mounted on or included in a vehicle (ADAS).

In some embodiments, the 1$^{st}$ and 2$^{nd}$ Tele cameras may be folded scanning Tele cameras, the scanning performed in a X-Z plane, i.e. orthogonal to baseline B. They may scan a scene by rotating one or more OPFEs. For example, the FOVs of cameras 302 and 304 may scan in the X-Z plane by rotating an OPFE around a rotation axis substantially parallel to the Y-axis (and baseline B).

In some embodiments, the first Tele camera may be a folded scanning Tele camera and the second Tele camera may be a (non-scanning) Tele camera having a fixed FOV.

In some embodiments, the FOV scanning may be in in a direction parallel to baseline B, i.e. in the X-Z plane by rotating an OPFE around a rotation axis substantially parallel to the Z-axis.

In some embodiments, the FOV scanning may be performed in two dimensions (2D). For example, the FOVs of cameras 302 and 304 may scan in the X-Z plane and in the X-Y plane by rotating an OPFE around, respectively, a rotation axis substantially parallel to the Y-axis and around a rotation axis substantially parallel to the Z-axis.

FIG. 3B shows triple-camera 300 and its components in a perspective view. First Tele camera 302 is a folded scanning camera that comprises an image sensor 312a and a lens 314a with a respective lens optical axis 308. Second Tele camera 304 is a folded scanning camera that comprises an image sensor 312b and a lens 314b with a respective lens optical axis 310. Image sensors 312a and 312b are characterized each by a respective sensor active area size and a sensor pixel size. Lenses 314a and 314b are characterized each by a respective effective focal length ($EFL_T$), marked $EFL_{T1}$ for Tele camera 302 and $EFL_{T2}$ for Tele camera 304. Tele cameras 302 and 304 also have respective native fields of view $FOV_{T1}$ and $FOV_{T2}$. Tele cameras 302 and 304 further comprise respective OPFEs 316a and 316b, e.g. a mirror (as shown) or a prism. Each OPFE has a reflection surface tilted by 45 degrees at a rest point from the respective Tele lens optical axis. Tele cameras 302 and 304 further comprise respective actuators 318a and 318b. Actuator 318 may tilt the reflecting surface of the respective OPFE by up to ±α degrees from the rest point (where exemplarily α may be up to 10, 20, 40 or 70 degrees). Actuator 318a or 318b may be for example a stepper motor or a voice coil motor (VCM), for example as described in co-owned patent application PCT/IB2017/057706.

Wide camera 306 includes an image sensor 322 and a lens 324 with a lens optical axis 326. In an embodiment, lens 324 may have a fixed (constant) effective focal length $EFL_W$. $FOV_W$ may be 30-130 degrees in the horizontal vehicle facing plane (i.e. a plane parallel to the road surface). Exemplarily (see FIG. 4), $FOV_W$ is given as 110 degrees.

In some embodiments and as shown in FIG. 3B, optical axes 308 and 310 may be oriented perpendicular to baseline B. Baseline B as shown is substantially parallel to X. In other embodiments, optical axes 308 and 310 may be oriented in parallel with baseline B.

In some embodiments, Tele camera 302 and/or Tele camera 304 may include two or more OPFEs. FOV scanning may be performed by rotating one OPFE, two OPFEs, or more than two OPFEs out of the two or more OPFEs. In FIG. 3B, the rotations are such that the center of each native FOV moves parallel to the Y axis.

FIG. 3C shows the two Tele cameras (now marked "Tele 1" and "Tele 2") with respective native FOVs in (a) a first position in which there is no overlap between native $FOV_{T1}$ and native $FOV_{T2}$, and (b) in a second (overlapping) position. The coordinates shown are aligned with the coordinates in FIG. 3B. By scanning in a direction orthogonal to the baseline, e.g. scanning in the X-Z plane as marked in FIG. 3A, both Tele 1 and Tele 2 have an extended $FOV_T$ that is significantly larger than the native $FOV_{T1}$ and native $FOV_{T2}$. For a method described herein, the overlap region marked in (b)—the center of the figure—is of highest relevance, as in this overlap region stereoscopic image data can be created for depth estimation. Tele cameras with scanning capabilities in one scanning direction and having a native $FOV_T$ of ca. 5-35 degrees in this direction may cover an extended FOV of e.g. 5-180 degrees in the scanning direction.

In some examples (as in FIG. 4), Wide camera 306, $1^{st}$ Tele camera 302 and $2^{nd}$ Tele camera 304 face a vehicle front side and share at least some of their respective native FOVs. Typically, $FOV_W$ is directed away from the vehicle toward the front (driving) direction and is substantially symmetrical vs. the two sides of the vehicle. In one operational mode, the $1^{st}$ and $2^{nd}$ Tele cameras are operational to scan extended $FOV_T$ ($FOV_{T1}$ and $FOV_{T2}$) inside $FOV_W$ and/or outside $FOV_W$.

Figure 4:
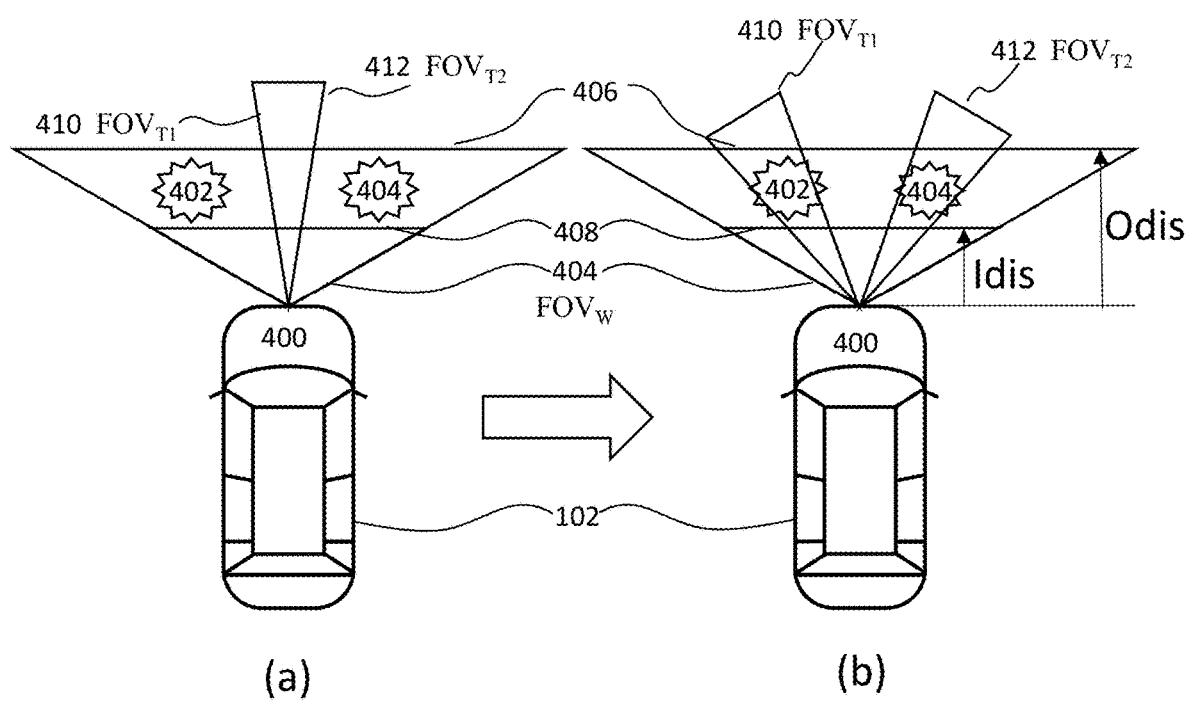
FIG. 4 shows schematically an illustration of an exemplary operation of a system as in FIG. 2A or 2B.

FIG. 4 shows schematically an illustration of—an exemplary method of operation of system 200 or 200'. Triple-camera 300 is installed in a front part of a vehicle 400. A triangle 404 represents $FOV_W$ and triangles 410 and 412 represent respectively native $FOV_{T1}$ and native $FOV_{T2}$, all projected in the same horizontal plane. In $FOV_W$, an "observation distance $O_{dis}$" 406 is defined as the minimal distance that allows system 300, to observe the existence of a potential OOI using an image from the Wide camera. An "identification distance $I_{dis}$" 408 is defined as the minimal distance that allows system 300 using to identify all the required information for making a decision an image from the Wide camera, as known in the art. According to one example, the OOI may be a road sign, observable but not readable in $O_{dis}$. An OOI may be observed in $O_{dis}$, but identification or distinction between distinguished between it being a road sign or a pedestrian is made only within $I_{dis}$. In other words, if an OOI is located before (closer to the Wide camera than) $O_{dis}$ 406 but further than $I_{dis}$ 408, then system 300 may use an image from the Wide camera to calculate that the OOI is located in $FOV_W$, but not to fully calculate required measures-of-action or responses needed. The output images of the first and the second Tele cameras have higher resolution than the output images of the Wide camera. For example, the output image of the first and the second Tele camera may have 3 to 25 times more resolution than the output image of the Wide camera, and consequently the identification distance of the first and the second Tele camera may be 3 to 25 times further away than $I_{dis}$ 408 of the Wide camera.

According to some examples, measures-of-action or responses of ADAS 210 or 210' may include one or more or a combination of the following: changing the speed and/or course of vehicle 400, operating an internal alarm to a driver, operating an external alarm, sending data information to, or calling an internet or cloud based service, the police, a road assistance service, etc.

In an example shown in FIG. 4(a), vehicle 400 approaches a first OOI 402 and a second OOI 404. Both OOIs are located between observation distance 406 and identification distance 408. While OOI 402 and OOI 404 are observable by the Wide camera, they may not be identifiable. In (a), in an initial state, native $FOV_{T1}$ and native $FOV_{T2}$ overlap and are directed in the same direction. As shown in FIG. 4(b), native $FOV_{T1}$ is then scanned to face OOI 402 such that first Tele camera 302 can capture OOI 402 with more detail. The extended $FOV_{T2}$ may be simultaneously or non-simultaneously (i.e. sequentially) scanned to face OOI 404 such that second Tele camera 304 can capture OOI 404. In other examples, e.g. based on a vision system like system 220', the detection of the OOIs may be performed by a sensor such as a sensor 232. Such sensor data may be used to direct the $1^{st}$ and $2^{nd}$ Tele cameras towards, respectively, OOI 402 and OOI 404. In yet other examples, image data of the $1^{st}$ and/or $2^{nd}$ Tele cameras may be used to direct the $1^{st}$ and/or $2^{nd}$ Tele cameras toward the OOIs. For example, Tele image data may be used to infer future positions, which may be used to direct the $1^{st}$ and $2^{nd}$ Tele cameras towards probable future positions of respective OOIs. For example, information on the movement of an OOI could be determined in a sequence of Tele image frames captured by the $1^{st}$ Tele and/or $2^{nd}$ Tele cameras. This information may be used to infer future movement and location of the same OOI and to direct the $1^{st}$ Tele camera and/or the 2$^{nd}$ Tele camera to follow the OOI. In yet other examples, the 1$^{st}$ Tele and 2$^{nd}$ Tele cameras may be directed towards a single OOI, so that there is a significant overlap of native FOV$_{T1}$ and native FOV$_{T2}$. In the scene segments where native FOV$_{T1}$ and native FOV$_{T2}$ overlap (as in FIG. 4(a), stereo imaging data with high Tele resolution is created. In yet other examples, one or both Tele cameras may "guide itself", i.e. solely Tele image data may be used for scanning or directing a Tele FOV.

Figure 5A:
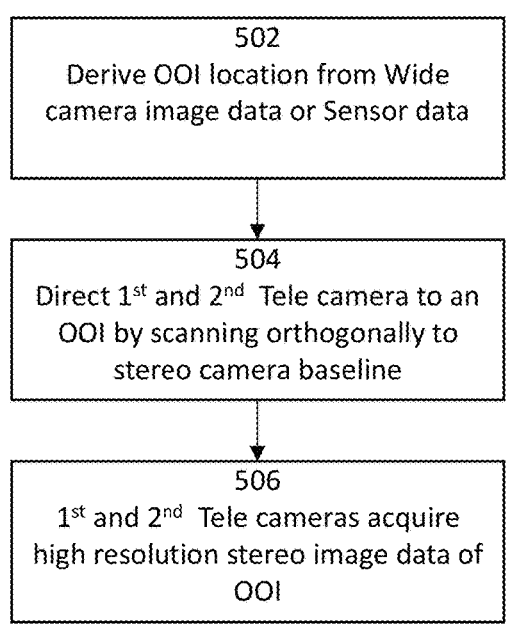
FIG. 5A shows schematically major steps in a flow chart of a method of operation as in FIGS. 2A and 2B.

FIG. 5A shows a flow chart of a method of operation of system 200 or system 200' as in the example of FIG. 4. In step 502, a Wide camera or a sensor are used to detect an OOI 402 and derive its location. Alternatively, images may additionally or optionally be acquired by one or both Tele cameras and OOI locations derived as described above. In step 504 and based on the information obtained in step 502, the 1$^{st}$ and 2$^{nd}$ Tele cameras are directed to the detected OOI (see description of FIG. 6). In step 506, both Tele cameras acquire an image of the OOI (e.g. simultaneously or in a time window that is small compared to movement of the vehicle or OOIs within the scene), to provide high (Tele) resolution stereo image data. The stereo image data is further processed as known in the art to generate a high resolution depth map of OOI 402.

Figure 5B:
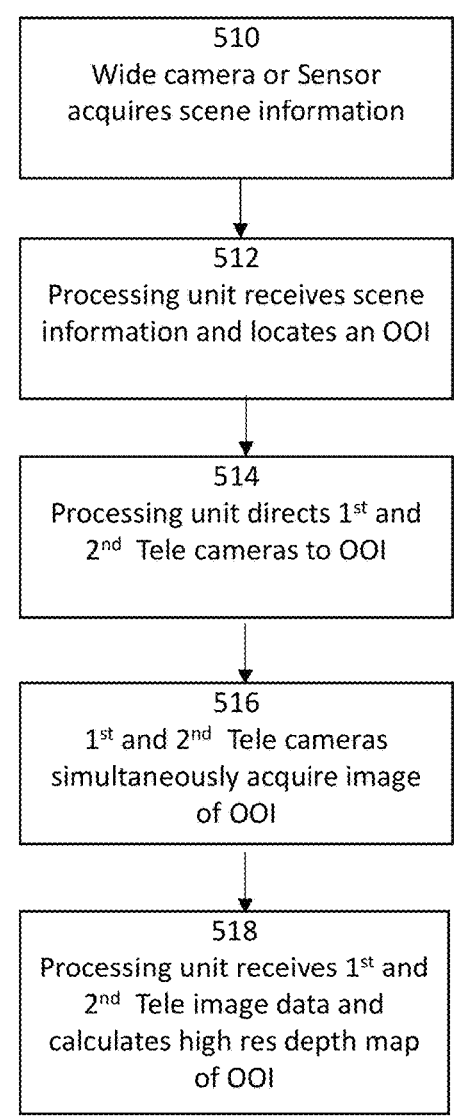
FIG. 5B shows details of some steps in FIG. 5A.

FIG. 5B shows one variant of the method of operation of FIG. 5A in more detail. In step 510, the Wide camera or the sensor acquires scene information from vehicle surroundings. In step 512, the processing unit receives scene information and locates OOI 402 within the scene. In step 514, the processing unit directs the 1$^{st}$ and 2$^{nd}$ Tele cameras to have their native FOV$_{T1}$ and native FOV$_{T2}$ include OOI 402. In step 516, the 1$^{st}$ and 2$^{nd}$ Tele cameras acquire stereo images (i.e. images with some or significant overlap between native FOV$_{T1}$ and native FOV$_{T2}$) of OOI 402 with high resolution. In step 518, the processing unit receives the high resolution stereo information on the OOI and calculates a high resolution depth map based on the high resolution stereo information. Optionally, the processing unit may run further 2D detection algorithms on the received image data.

Figure 5C:
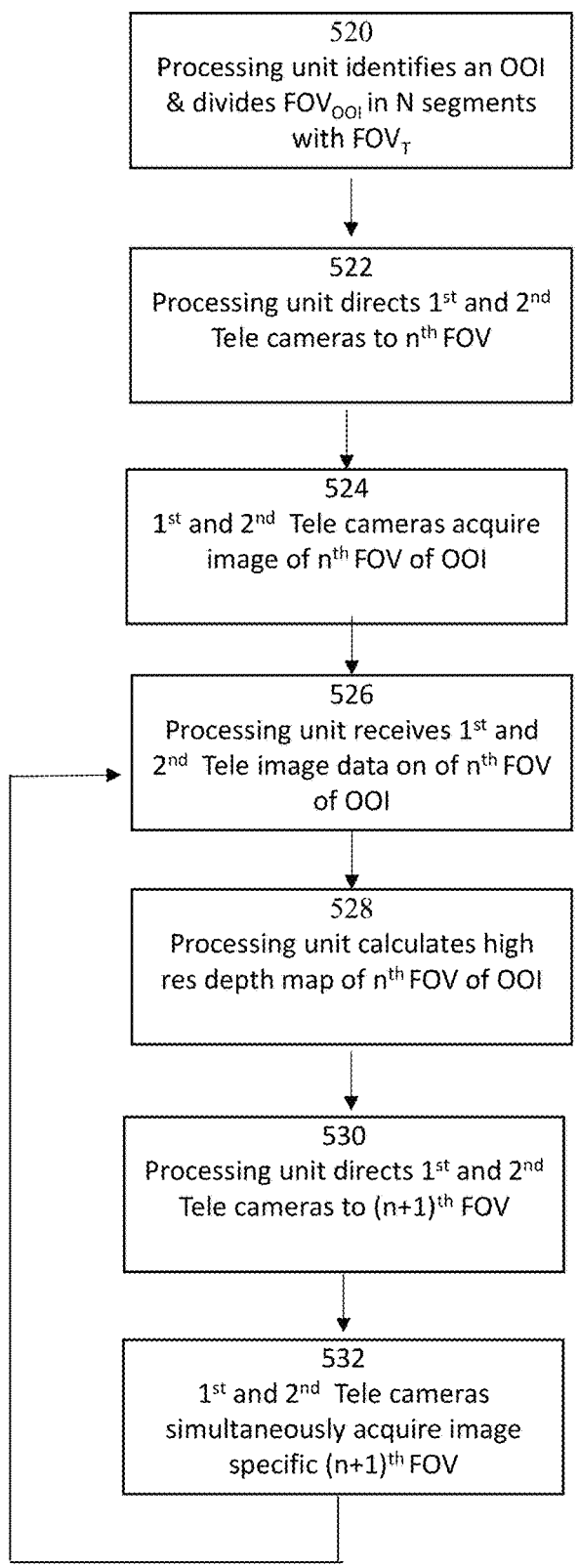
FIG. 5C shows schematically major steps in a flow chart of another method of operation as in FIGS. 2A and 2B.

FIG. 5C shows another variant of the method of operation of FIG. 5A in more detail. This variant refers to cases in which an OOI like 402 covers FOV segments that are larger than the native FOV$_{T1}$ and native FOV$_{T2}$. In such cases, the FOV segment can be captured with Tele image resolution when it is divided into N segments 0, 1, . . . , n, (n+1), . . . N, each n$^{th}$ segment having a n$^{th}$ FOV (FOV$_n$) equal to the native FOV$_T$. The divided segments are scanned sequentially, one at a time. A location of the OOI can be derived from the Wide camera or from other sensor data, or can be provided a priori for specific geographic or street situations. A priori segments of the vehicle's FOV may include a strip where typically many OOIs are located, e.g. a pedestrian area within a city and/or traffic signs at fast lanes or on the street ahead.

In step 520, the processing unit identifies the OOI with FOV>native FOV$_T$ and divides this FOV into N segments, each segment n having a FOV$_n$ equal to or smaller than the native FOV$_T$. In step 522, in the process of scanning a FOV sequentially, the processing unit directs 1$^{st}$ and 2$^{nd}$ Tele cameras to have their native FOV$_T$ face the n$^{th}$ FOV of the OOI. In step 524, the 1$^{st}$ and 2$^{nd}$ Tele cameras acquire stereo images (i.e. images with some or significant FOV overlap) of the n$^{th}$ image segment in the OOI. In step 526, the processing unit receives the first and second Tele image data, thus having both Tele information and stereo information on OOI 402. In step 528, the processing unit calculates a high resolution depth map based on the stereo data. In step 530, the processing unit directs the 1$^{st}$ and 2$^{nd}$ Tele cameras to have their respective native FOV$_T$s face the (n+1)$^{th}$ FOV of the OOI. In step 532, the 1$^{st}$ and 2$^{nd}$ Tele cameras acquire stereo images of the (n+1)$^{th}$ image segment of the OOI.

Figure 5D:
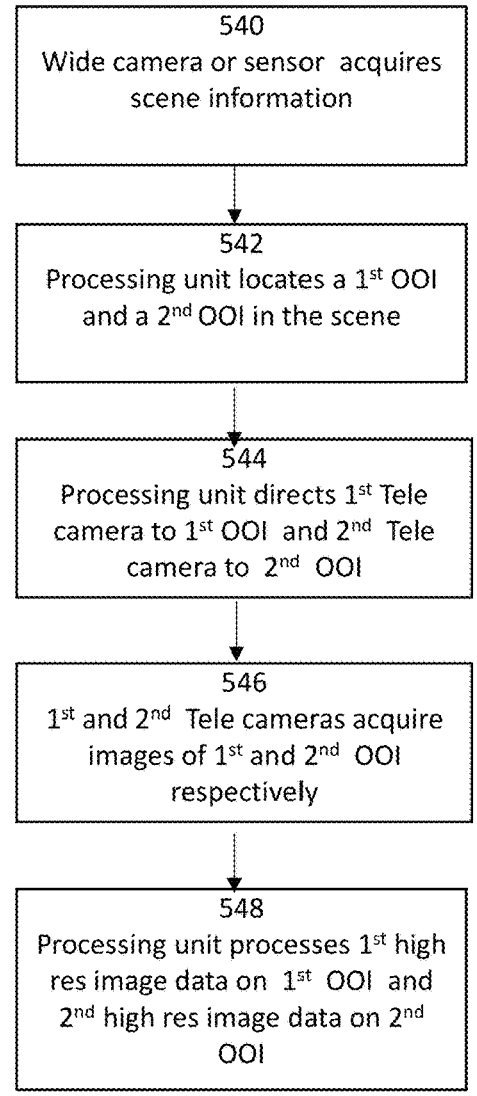
FIG. 5D shows details of some steps in FIG. 5B.

FIG. 5D shows in a flow chart another method of operation of system 200 and/or 200' as in the example of FIG. 4. In step 540, the Wide camera or a sensor acquires scene information from vehicle surroundings. In step 542, the processing unit receives the scene information acquired in step 540 and detects the existence of a first OOI 402 and of a second OOI 404 in the surroundings. In step 544, the processing unit directs the first Tele camera to have its native FOV$_{T1}$ face OOI$_1$ 402, and the second Tele camera to have its native FOV$_{T2}$ face OOI 404. In step 546, first Tele camera acquires a Tele image of OOI 402 and second Tele camera acquires a Tele image of OOI 404. In step 548, the processing unit receives the first and second Tele images, thereby having high resolution (Tele) information on OOI 402 and OOI 404.

Assuming all intrinsic and extrinsic parameters of the 1$^{st}$ and 2$^{nd}$ scanning Tele cameras are known, an object's distance Z can be calculated using equation 1:

$$Z = \frac{f * B}{D * ps} \quad (1)$$

where Z is depth estimation to be calculated by a processing unit, f is the camera's focal length or EFL, B is the baseline, D is disparity in pixels, and ps is the pixel size of the image sensor. The disparity constitutes the input variable for the depth estimation according to equation 1. B, ps and f are known and part of the calibration set. A depth estimation error Δas function of disparity error ΔD is given by equation 2:

$$\Delta Z = \frac{ps * Z^2}{f * B} \Delta D \quad (2)$$

B is oriented vertically (with respect to a horizontally oriented street). For typical stereoscopic systems, ΔD is limited by the quality of the system's calibration set, e.g. its mechanical stability (towards temperature, mechanical shocks such as drop, etc.). For a stereoscopic system based on scanning cameras, ΔD may additionally result from a position error resulting from the scanning process (e.g. due to a delay between scanning processes of the Tele cameras). The position error for a certain scanning direction lies within a plane spanned by B and an object point. In a system as described herein, B is oriented orthogonally to a scanning direction, so that a scanning caused position error originating in a scanning error is not translated into disparity error, and thus does not induce an error into the depth map estimation. Equation 2 shows that a system based on Tele cameras (characterized by large EFLs) as described herein has better accuracy than a system based on Wide cameras (assuming identical additional parameters). This allows the design of systems with small baselines (i.e. small overall dimensions) that still exhibit decent accuracies.

Embodiments that comprise two Tele cameras that have an identical native FOVs have the advantage over systems using two cameras with different native FOVs in that a calibration of the stereo image data can be done by "line-to-line synchronization", as known in the art.

Figure 6A:
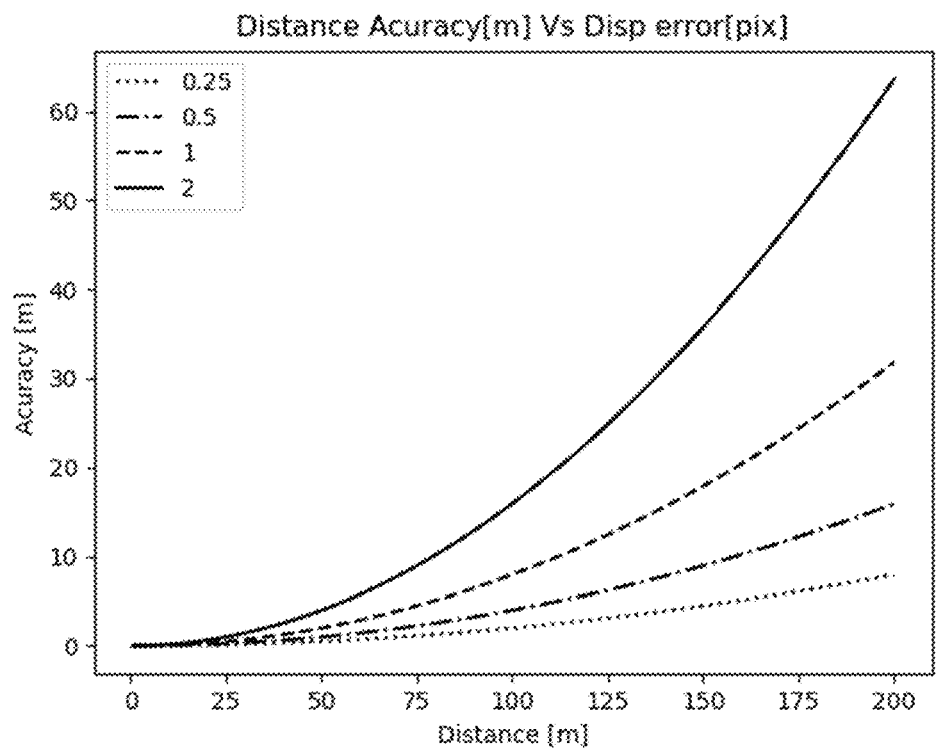
FIG. 6A shows a comparison of depth estimation accuracy in meters for distances of up to 200 meters based on different errors of the input values for disparity in pixels D.
Figure 6B:
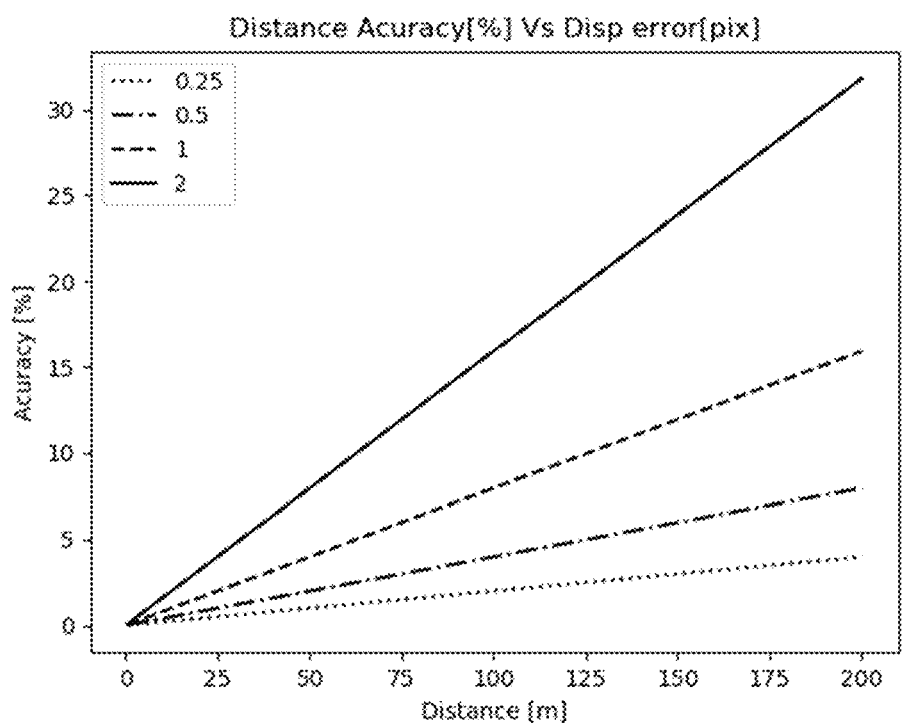
FIG. 6B shows a comparison of depth estimation accuracy in percentage for distances of up to 200 meters based on different errors of the input values for disparity in pixels D.

FIG. 6A shows a comparison of depth estimation accuracy in meters for distances of up to 200 meters based on different errors of the input values for D. The actual z distance in meters is displayed on the x axis ("ground truth"), and the accuracy of z distance determination by disparity in meters is displayed at the y axis. FIG. 6B shows a comparison of depth estimation accuracy in percentage for distances of up to 200 meters based on different errors of the input values for D. Typically, in well aligned stereo camera systems as known in the art, the accumulated errors in the calibration data add up to an error of about 0.25 pixels (dotted line) in a very good calibration, and to about 0.5 pixels (dashed-dotted line) in a decent calibration.

In a stereoscopic camera system comprising two Tele cameras that scan a FOV in a direction parallel to a baseline vector and used to determine a depth map from the disparity in pixels, the accuracy of a depth map depends on the accuracy of a position sensor of the scanning mechanism. Assume that the first and the second Tele cameras have an EFL=22 mm, that B=120 mm, and that each Tele image sensor has 3000 horizontal pixels. A range of about 60 degrees is scanned in the horizontal direction. Typically the scanning is enabled by an OPFE, the position of the OPFE is measured by a Hall sensor rigidly coupled to the OPFE, and a sensing magnet that is rigidly coupled to a housing surrounding the OPFE (or vice versa). A Hall sensor may supply a position of an OPFE with 12 bit information. Based on these values, the disparity error is 2 pixels (solid line) in a best case scenario (theoretical limit given by Hall sensor 12 bit information).

FIG. 6A and FIG. 6B show that a depth map estimation for a design that uses a stereo camera system described herein (dotted line or dashed-dotted line) and which scans a Tele FOV in a direction orthogonal to a baseline has an accuracy of about 3% at 100 meter, much better than a system that scans the FOV parallel to a baseline vector, which provides an accuracy of about 15% at 100 meter (solid line).

In conclusion and exemplarily, an overall five-fold better depth estimation accuracy may be expected using a system and method described herein. Also, a stereo camera system using Tele cameras as described herein has the advantage over a stereo camera system using large FOV Wide cameras in that there is significantly less "wide-angle distortion" as known in the art. Wide-angle distortion describes the fact that objects close to the camera appear abnormally large relative to more distant objects.

For the sake of clarity the term "substantially" is used herein to imply the possibility of variations in values within an acceptable range. According to one example, the term "substantially" used herein should be interpreted to imply possible variation of up to 5% over or under any specified value. According to another example, the term "substantially" used herein should be interpreted to imply possible variation of up to 2.5% over or under any specified value. According to a further example, the term "substantially" used herein should be interpreted to imply possible variation of up to 1% over or under any specified value.

While this disclosure describes a limited number of embodiments, it will be appreciated that many variations, modifications and other applications of such embodiments may be made. In general, the disclosure is to be understood as not limited by the specific embodiments described herein, but only by the scope of the appended claims.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. A system, comprising:
    a) a first scanning camera operative to provide first image data of an object or scene and having a first native field of view FOV1, the first scanning camera operative to change the location of FOV1 on the object or in the scene so as to scan in a first plane over a solid angle larger than the native FOV1;
    b) a second scanning camera operative to provide second image data of the object or scene and having a second native field of view FOV2, the second scanning camera operative to change the location of FOV2 on the object or in the scene so as to scan in a second plane over a solid angle larger than the native FOV2, wherein the first plane and the second plane are substantially parallel, wherein the first and second scanning cameras have respective centers that lie on a first axis that is perpendicular to the first and second planes and are separated by a distance B from each other; and
    c) a camera controller operatively coupled to the first and second scanning cameras and configured to control the scanning of each camera.

2. The system of claim 1, wherein the first and second scanning cameras are folded scanning cameras, each camera including a respective optical path folding element (OPFE).

3. The system of claim 2, wherein the scanning is performed by rotating the respective OPFE.

4. The system of claim 3, wherein the rotating of the respective OPFE is around an axis substantially parallel to the first axis.

5. The system of claim 1, wherein the camera controller is configured to control the scanning of each camera autonomously.

6. The system of claim 5, wherein the control of the scanning of each camera is based on use of the first image data and/or the second image data as input.

7. The system of claim 1, wherein the camera controller is configured to calculate depth information from the first image data and/or from the second image data.

8. The system of claim 1, wherein the camera controller is configured to calculate depth information from stereo image data derived from the first and the second image data.

9. The system of claim 1, wherein 2 cm>B>20 cm.

10. The system of claim 1, wherein 7.5 cm>B>15 cm.

11. The system of claim 1, wherein FOV1=FOV2.

12. The system of claim 1, wherein the system comprises a third camera operative to provide third image data of the object or scene and having a third field of view FOV3 larger than FOV1 and FOV2.

13. The system of claim 12, wherein the first camera or the second camera has a respective resolution at least two times higher than a resolution of the third camera.

14. The system of claim 12, wherein the control of the scanning of each camera is based on use of the third image as input.

15. The system of claim 1, wherein the system further comprises a sensor selected from the group consisting of a radar sensor, an ultra-sound sensor, and a light detection and ranging sensor.

16. The system of claim 15, wherein the control of the scanning of each camera is based on use of image data from the first camera and/or the second camera and/or the sensor.

\* \* \* \* \*